(12) United States Patent
Hallett

(10) Patent No.: US 8,376,699 B1
(45) Date of Patent: Feb. 19, 2013

(54) VORTEX HYDRO TURBINE

(76) Inventor: Martin D Hallett, Port Edwards, WI (US)

( * ) Notice: Subject to any disclaimer, the term of this patent is extended or adjusted under 35 U.S.C. 154(b) by 621 days.

(21) Appl. No.: 12/558,079

(22) Filed: Sep. 11, 2009

Related U.S. Application Data

(60) Provisional application No. 61/195,630, filed on Oct. 8, 2008.

(51) Int. Cl.
*F04D 29/44* (2006.01)
(52) U.S. Cl. .............. 415/211.2; 415/221; 415/906
(58) Field of Classification Search .............. 415/906, 415/909, 3.1, 232, 207, 221, 211.2
See application file for complete search history.

(56) References Cited

U.S. PATENT DOCUMENTS

| 4,076,448 A | * | 2/1978 | Sanders, Jr. ............ 415/198.1 |
| 4,101,246 A | | 7/1978 | Erickson |
| 4,452,046 A | * | 6/1984 | Valentin ............ 60/641.11 |
| 4,452,562 A | * | 6/1984 | Hsu ............ 415/208.1 |
| 4,464,580 A | * | 8/1984 | Miller et al. ............ 290/52 |
| 6,943,461 B2 | | 9/2005 | Kaploun |
| 7,162,770 B2 | | 1/2007 | Davidshofer |
| 7,204,672 B2 | | 4/2007 | Sewell |
| 2007/0096472 A1 | * | 5/2007 | Mondl ............ 290/54 |

* cited by examiner

*Primary Examiner* — Ninh H Nguyen
*Assistant Examiner* — William Grigos
(74) *Attorney, Agent, or Firm* — Michael I. Kroll

(57) ABSTRACT

The Vortex Hydro Turbine takes water through an inlet from the current in which it is submerged. The water inlet reduces the cross-sectional area for the water that flows into the vortex chamber and thus increases the velocity of the water into a specially designed cylindrical chamber. The top of the chamber is specifically left open allowing the water now traveling at an increased velocity to disperse toward outlet as it rotates around the chamber, and then reintegrate into the existing environmental regime. This expansion creates a low pressure area in the center of the vortex chamber that is applied to the back side of a turbine blade system either directly or through a connecting tube depending on configuration.

8 Claims, 10 Drawing Sheets

VORTEX HYDRO TURBINE

RELATED APPLICATIONS

Figure 1:
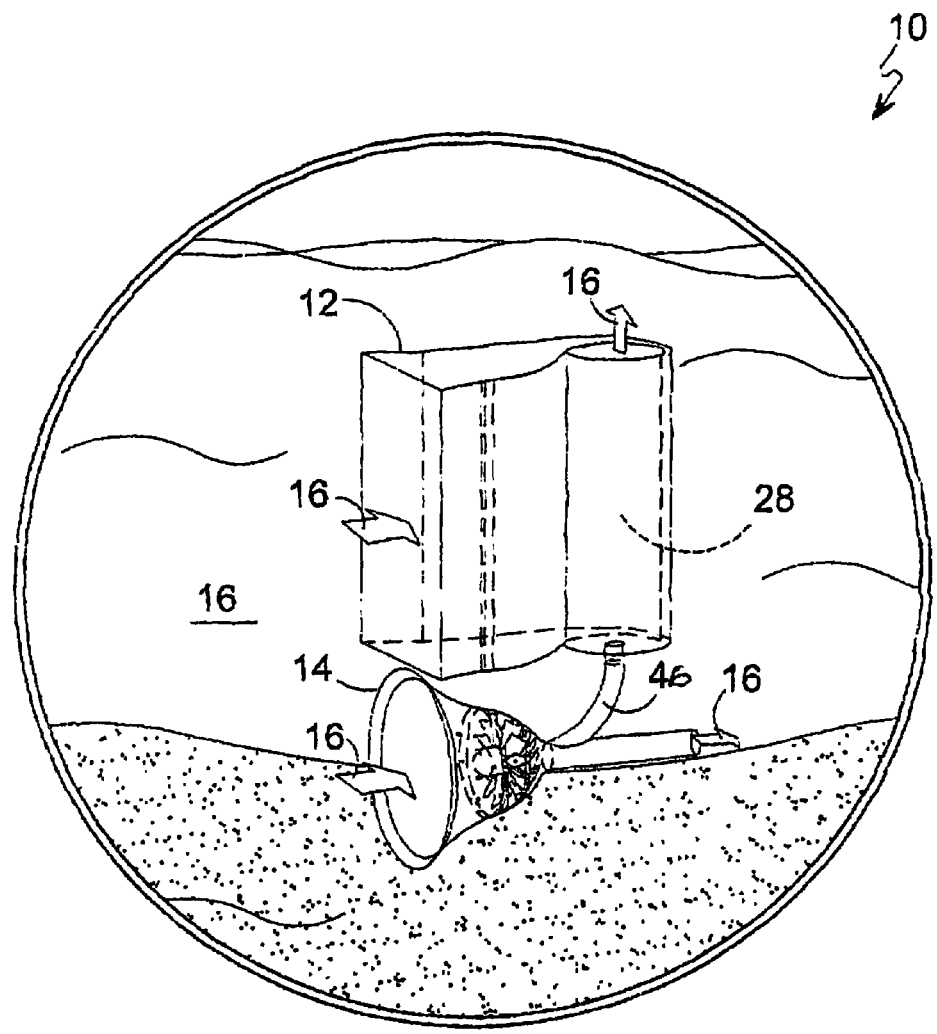

This application is subject to US provisional application Ser. No. 61/195,630 filed 8 Oct. 2008.

Please incorporate by reference all information in said provisional application into this instant application.

BACKGROUND OF THE INVENTION

1. Field of the Invention

The present invention relates generally to turbines and, more specifically, to impart a low pressure state within a turbine blade system exhaust wake thereby enabling an increase volumetric flow through said blade system. Further providing an enablement of the present invention whereby an increase in vortex size increases the flow rate/pressure differential through the lower unit increasing the power output.

The invention provides hydro-power generation, generating power in a free flowing stream or open current of water. With increasing demands for energy and limited supplies of fossil fuels, renewable energy sources with minimal environmental impacts are critically needed. A new type of water turbine is proposed that extracts kinetic energy from a water current without the necessity of a dam to impound the current, thus reducing the environmental impact.

The Vortex Hydro Turbine uniquely utilizes flowing water entering into a vortex chamber to create a vacuum. This pressure differential is utilized to increase water velocity/pressure differential across a turbine to garner more power from the blade system than can be generated from a standard blade system. This system generates an increase in power which allows the use of fewer units per kW generation, thereby decreasing construction costs, minimizing environmental impact, and reducing operational costs.

Unshrouded blade systems are theoretically limited to a maximum efficiency of 59% (Betz limit for propeller efficiency in a free flowing stream). This invention has investigated the feasibility of generating power more efficiently by using natural currents to create a vortex inside a chamber. The vortex creates a vacuum (negative pressure) within the chamber, which results in a relatively large pressure difference from the outside to the inside of the chamber. This vacuum then induces flow into the chamber through a rotor that is connected to a generator for producing power. The efficiency of this method exceeds that of the standard unshrouded blade system, in appearing to reduce the cause of Betz limit by inducing a higher flow through the blades and a larger vacuum behind the blades so that we can produce more power from the same environmental free flowing water.

Depicted in the accompany drawings is an enablement of the aforementioned only for illustrative purposes in describing the instant invention.

2. Description of the Prior Art

There are other devices designed for using vortexes. Typical of these is U.S. Pat. No. 4,101,246 issued to Erickson on Jul. 18, 1978.

Another patent was issued to Kaploun on Sep. 13, 2005 as U.S. Pat. No. 6,943,461. Yet another U.S. Pat. No. 7,162,770 was issued to Davidshofer on Jan. 16, 2007 and still yet another was issued on Apr. 17, 2007 to Sewell as U.S. Pat. No. 7,204,672.

U.S. Pat. No. 4,101,246

Inventor: John W. Erickson

Issued: Jul. 18, 1978

A vortex jet pump is provided in which circumferential flow in a fluid flow passage through the pump is induced by a tangential power liquid jet inlet into the passage between its suction inlet and its outlet. The pump, which has no moving parts, has a housing providing a fluid flow passage between a pumped fluid suction inlet and a pumped fluid outlet downstream therefrom. Downstream from the power liquid jet inlet there is a throat in the passage having a flow cross section less than the flow cross section of the passage adjacent the power inlet jet inlet. A diffuser section is provided in the passage downstream from the throat and includes means for converting primarily circumferential fluid flow to primarily axial fluid flow in the passage. Preferably such means comprises fixed vanes in the passage downstream for the power liquid let inlet. Means are provided upstream from the power liquid jet inlet for injecting fluid into the passage in a primarily tangential direction for initiating circumferential flow in the passage. The velocity head of the injected fluid is less than the velocity head of the power liquid injected through the jet inlet to minimize cavitation.

U.S. Pat. No. 6,943,461

Inventor: Solomon Kaploun

Issued: Sep. 13, 2005

A wind vortex tower is enhanced by kinetic energy and heat of quasi-tangential and upward jets of saturated steam energizing, accelerating tornado-type flow and supporting stable electricity generation during the insufficient winds and calm. For action instead of absent wind at starts and operation over a long time, a staged system of flexible nozzles injects the steam jets into the zones of vortex channel. The system controls the tornado-type flow in the vorticity energizer, swirlers of sucked ambient air, condensate separators, re-enhancer of airflow and top diffuser. The steam is flashed from partially stored condensate heated nearly to 100.degree. C. The condensate is partially delivered after centrifugal separation from saturated vortex core. The outside water heating system has one or two of compatible renewable, waste and secondary, or initial heat sources, and is intensified via sucking of heated water by vortex flow. A large-rating flow-through electric generator has an alternating magnetic whirl formed by magnetic concentrators whirled near vortex core and a three-phase stator with switched modules. The simplified towers are used for water and conditioned air production.

U.S. Pat. No. 7,162,770

Inventor: Don Davidshofer

Issued: Jan. 16, 2007

A vacuum cleaner having a nozzle, a handle pivotally attached to the nozzle, and a suction motor that has an inlet, and is adapted to generate a working air flow through the nozzle. The vacuum includes a separation system having an outer wall and a closed tube having at least a portion of its length located within the wall, and forming a separation chamber between the wall and the closed tube. The separation chamber has an inlet, in communication with the nozzle, that is adapted to impart a tangential component to the air flow as it flows through the separation chamber. A hollow tube is generally coaxially aligned with the closed tube and has a tube inlet at an end adjacent the closed tube and a tube outlet at an end opposite the closed tube. The tube outlet is in fluid communication with the suction motor inlet.

U.S. Pat. No. 7,204,672

Inventor: Gary Sewell

Issued: Apr. 17, 2007

A multi-modal forced vortex device is described having a top plate and a side wall creating a partially enclosed volume. The top plate includes one or more adjustable fluid openings to permit, or restrict, fluid flow into and out of the partially enclosed volume. Rotating blades housed within the partially enclosed volume are manipulated (through control of their pitch and, possibly, their speed) in conjunction with the adjustable fluid openings to generate a variable magnitude attractive force in a first mode, a variable magnitude down or pushing force in a second mode, a variable magnitude up or lifting force in a third mode or variable magnitude yaw, pitch and roll forces in a fourth mode.

While these vortex systems may be suitable for the purposes for which they were designed, they would not be as suitable for the purposes of the present invention, as hereinafter described.

The aforementioned systems while employing Vortices do not deal with power generation from free flowing streams and none of their assumptions or directions were used in the design or Idea of this system.

SUMMARY OF THE PRESENT INVENTION

The Vortex Hydro Turbine is a significant departure from existing systems. The system is designed to take advantage of available kinetic energy in a given area of free flowing water that has not been utilized to this point By creating a vortex, which applies a vacuum to the backside of a blade system, an increased power generation is created over an unshrouded free stream system.

The system can be sized to the existing velocity and flow direction (allowing for tidal backflow) of a free flowing stream, river, or ocean current for optimal power generation.

The vortex is defined by the geometry of the chamber and incoming flow rate. The more defined the vortex becomes, the greater the vacuum that is created in the center of the vortex. This vacuum is connected to the back side of a blade system allowing a greater flow/velocity through the blades for more torque.

The system overcomes many existing hydrodynamic power systems limitations. With the addition of a velocity stack to smooth and funnel a larger area of water into the blade system this enhances the gains already achieved by the vortex portion of the system.

A primary object of the present invention is to provide a system that creates a low pressure state within a turbine blade exhaust wake.

Another object of the present invention is to provide a Vortex Hydro Turbine comprising a vortex unit and a turbine unit.

Yet another object of the present invention is to provide a Vortex Hydro Turbine wherein said vortex unit is comprised of a housing having no moving parts.

Still yet another object of the present invention is to provide a Vortex Hydro Turbine wherein the housing (buoyancy shroud) provides a dry space for the submerged unit to house the generator/electronics and to allow service access.

An additional object of the present invention is to provide a Vortex Hydro Turbine wherein the housing (buoyancy shroud) provides multiple anchoring options.

A further object of the present invention is to provide a Vortex Hydro Turbine wherein said vortex unit housing has a free flowing current intake port and a free flowing current output port.

A yet further object of the present invention is to provide a Vortex Hydro Turbine wherein said vortex unit housing has a depending conduit providing fluid communication with an exhaust stream of said turbine unit.

A still yet further object of the present invention is to provide a Vortex Hydro Turbine wherein said vortex unit housing is contoured from said intake port providing structure to create a vortex extending between the housing output port and the depending conduit.

Another object of the present invention is to provide a Vortex Hydro Turbine wherein said turbine unit has an intake port whereby free flow current provides motive force for turning a downstream blade system.

Yet another object of the present invention is to provide a Vortex Hydro Turbine wherein said blade system has an intake port and an exhaust port.

Still yet another object of the present invention is to provide a Vortex Hydro Turbine wherein said blade system exhaust port is in fluid communication with said depending conduit.

An additional object of the present invention is to provide a Vortex Hydro Turbine wherein said blade system exhaust stream is in fluid communication with the vortex stream extending to said current output port.

A further object of the present invention is to provide a Vortex Hydro Turbine in a freeing flow stream, river, or ocean current to create power with an exponential output when compared to an unshrouded free stream system. The output was determined using advanced flow simulation software (CFD) that utilized near area effect and takes into account turbulence and friction. Target power output is calculated using the $\frac{1}{2} A d v^3$ to determine the velocity through the blade system. At which point the size of the communications tubing, vortex and connections are designed to achieve the velocity.

A yet further object of the present invention is to provide a Vortex Hydro Turbine placed in existing open water current where the system can generate power in a current as little as 0.5 meters per second for power generation.

A still yet further object of the present invention is to provide a Vortex Hydro Turbine having a vortex chamber for funneling water therethrough.

Another object of the present invention is to provide a Vortex Hydro Turbine having an open-topped vortex chamber wherein funneled water enters and is allowed to rapidly rotate around and out of the chamber top, which creates a subsequent low pressure area in the center of the chamber that is fed to the backside of the turbine blade system.

Yet another object of the present invention is to provide a Vortex Hydro Turbine having a vortex chamber whereby the strength of the vacuum created is a function of the dimensions of said vortex chamber.

Still yet another object of the present invention is to provide a Vortex Hydro Turbine having a bottom plate on the inlet of the vortex chamber with a rise in slope as it enters the chamber shaping the water as it enters the chamber to create a more defined vortex.

An additional object of the present invention is to provide a Vortex Hydro Turbine having a turbine blade system with a fluid velocity stack that smoothes the water flow into the blade system and increases the pressure differential between the front of the blades and the backside of the blades.

A further object of the present invention is to provide a Vortex Hydro Turbine having a depending conduit that is sized to optimize the flow/vacuum to the backside of the blade system.

A yet further object of the present invention is to provide a Vortex Hydro Turbine having a tail pipe that vents from directly behind the blades where it joins with the depending conduit from the vortex chamber; thus allowing additional water flow through the blades over what the vacuum from the vortex alone provides.

A still yet further object of the present invention is to provide a Vortex Hydro Turbine having a tail pipe that contains a choke (not pictured) that can be used to optimize the flow through the system and compensate for free stream velocity variations.

Another object of the present invention is to provide a Vortex Hydro Turbine having a stator in front of the blade system to shape the water flow into the blades and to allow mounting of the blade/hub assembly to the velocity stack.

Yet another object of the present invention is to provide a Vortex Hydro Turbine having a ring gear mounted to the outside of the blades, out of the flow path of the water so that a generator may be connected to the blades in a manner that will not interfere with or reduce the efficiency of the blade system.

Additional objects of the present invention will appear as the description proceeds.

The present invention overcomes the shortcomings of the prior art by providing a low pressure state within a turbine blade system exhaust wake thereby creating an increased velocity/volumetric flow through said blade system and preventing stagnation of water flow behind the blades. Further providing an enablement of the present invention whereby an increase in vortex size increases the flow rate through the lower unit hence increasing power output.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
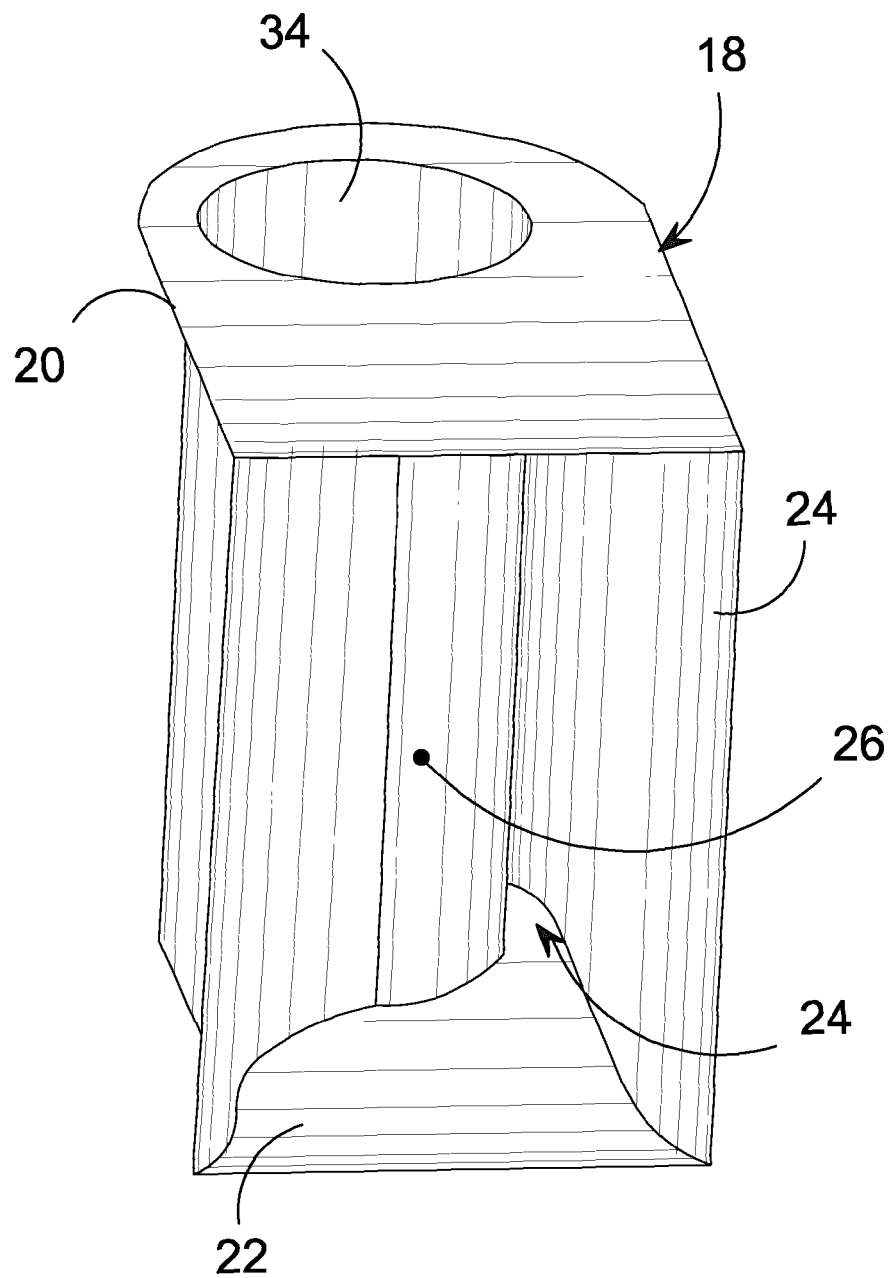
Figure 3:
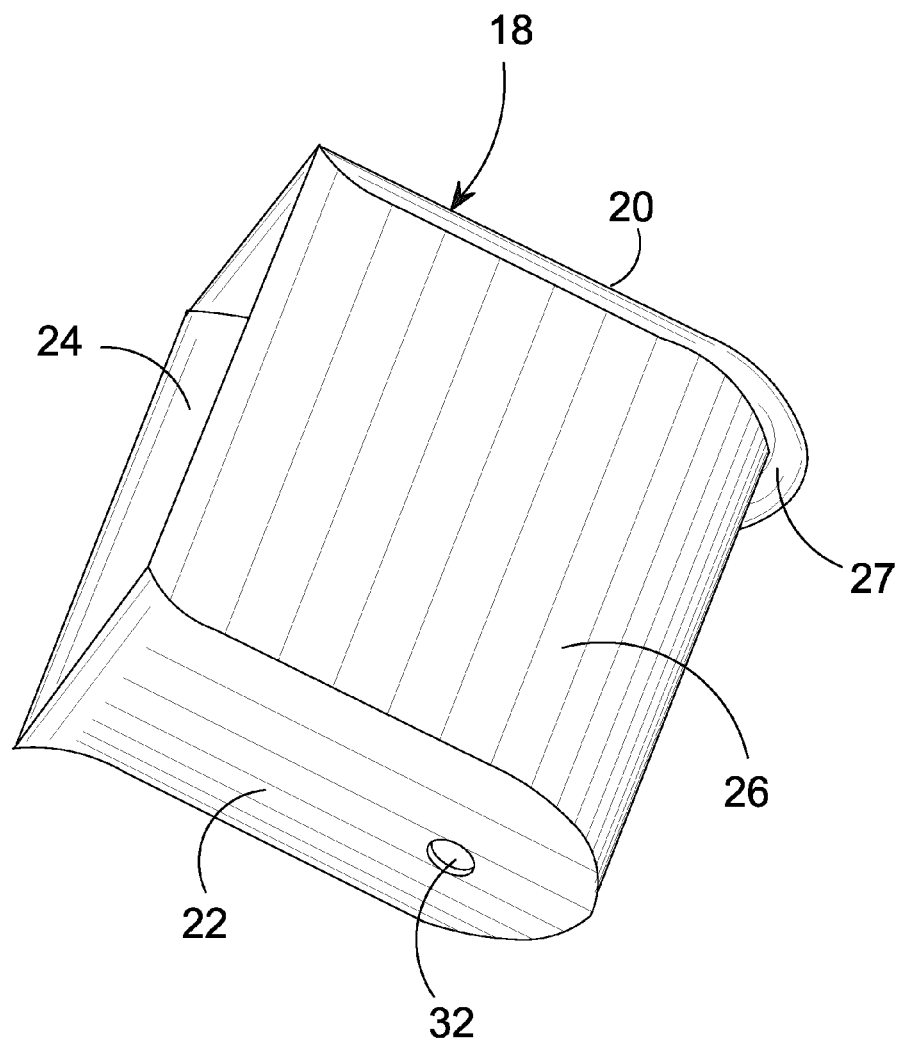
Figure 4:
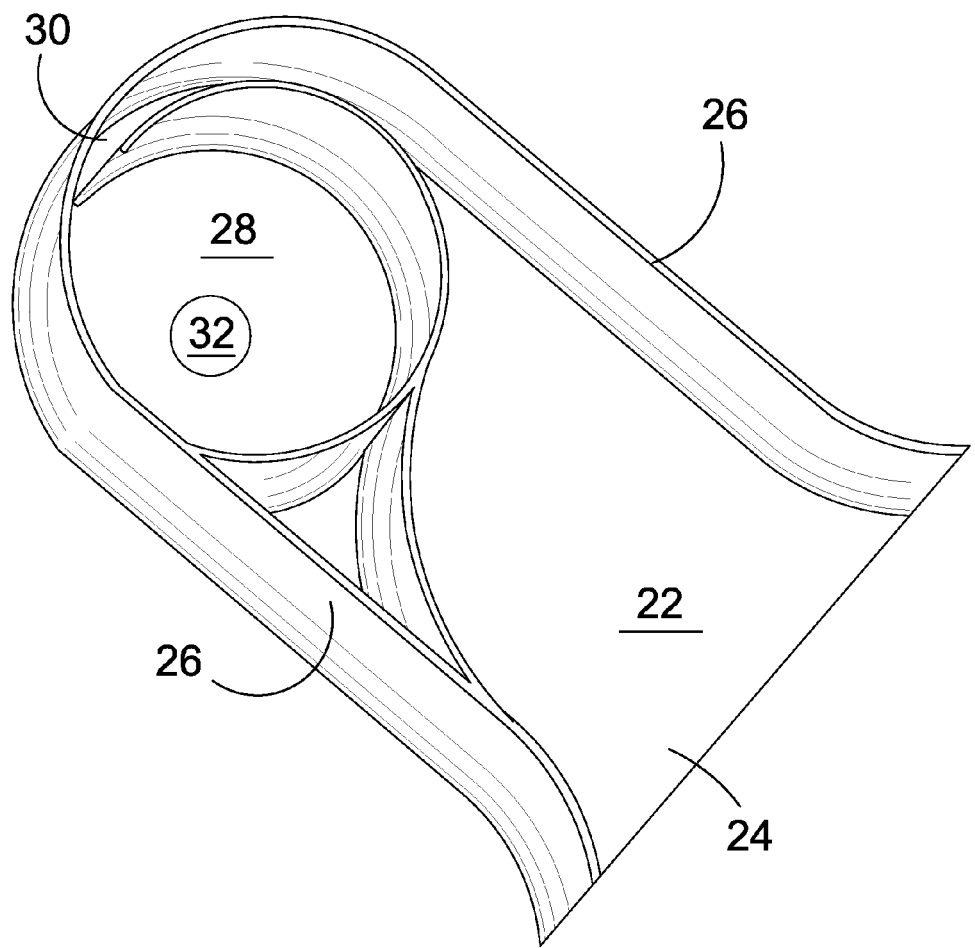
Figure 5:
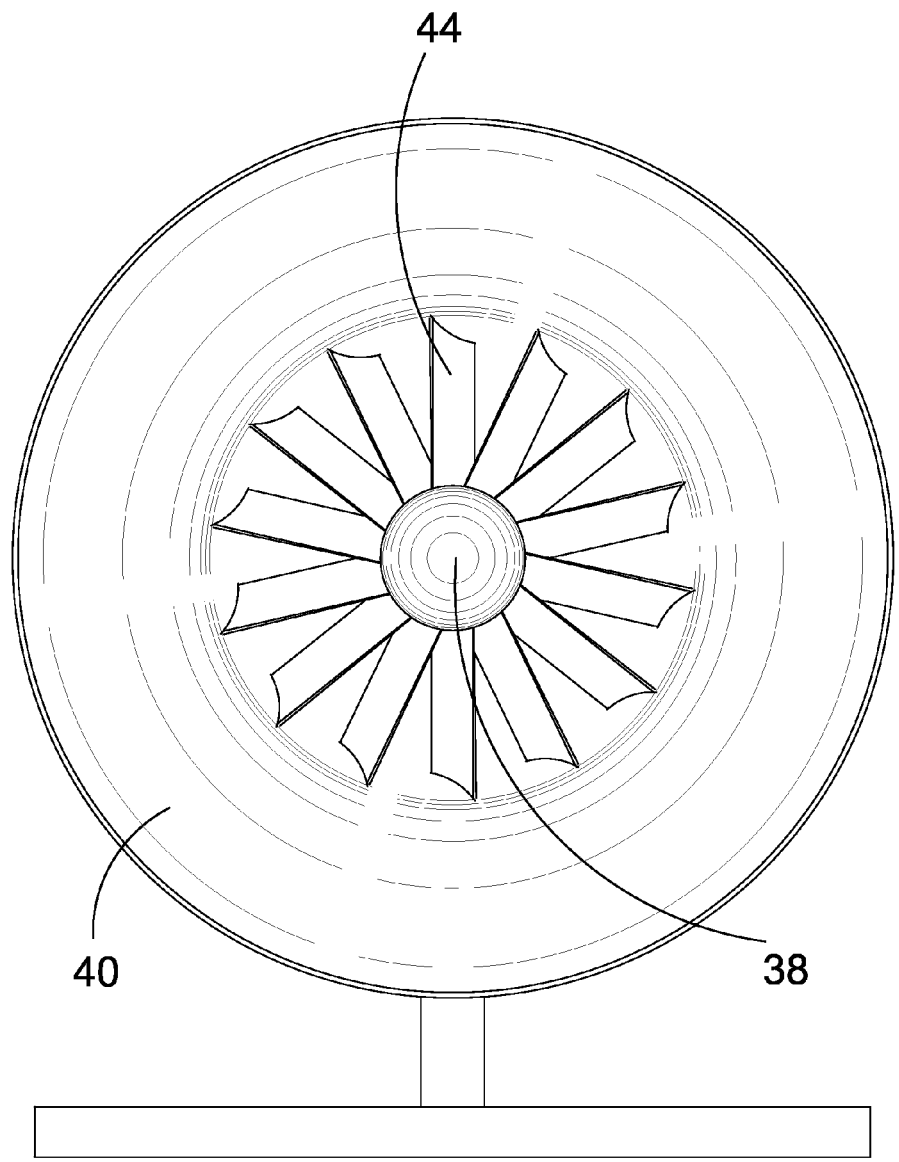
Figure 6:
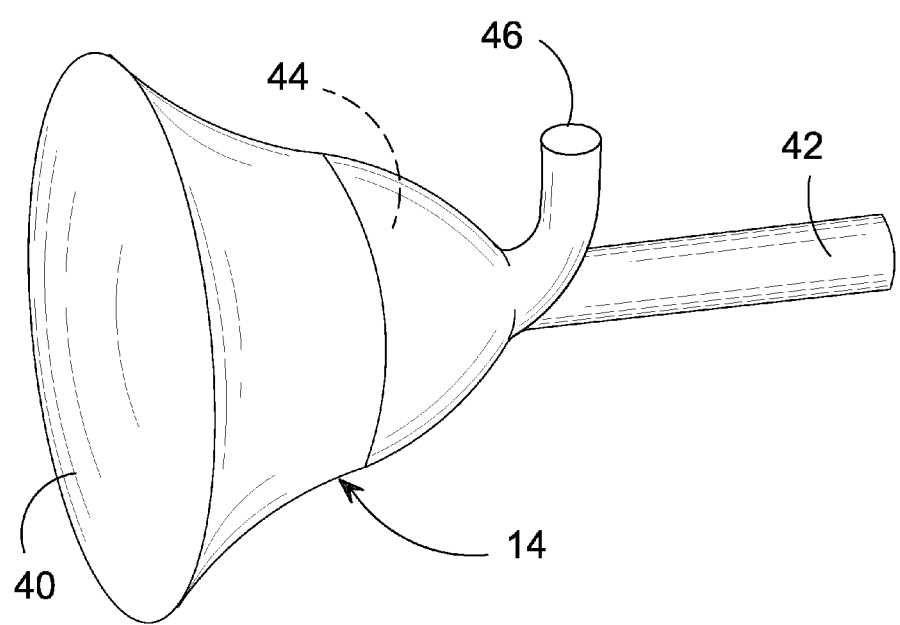
Figure 7:
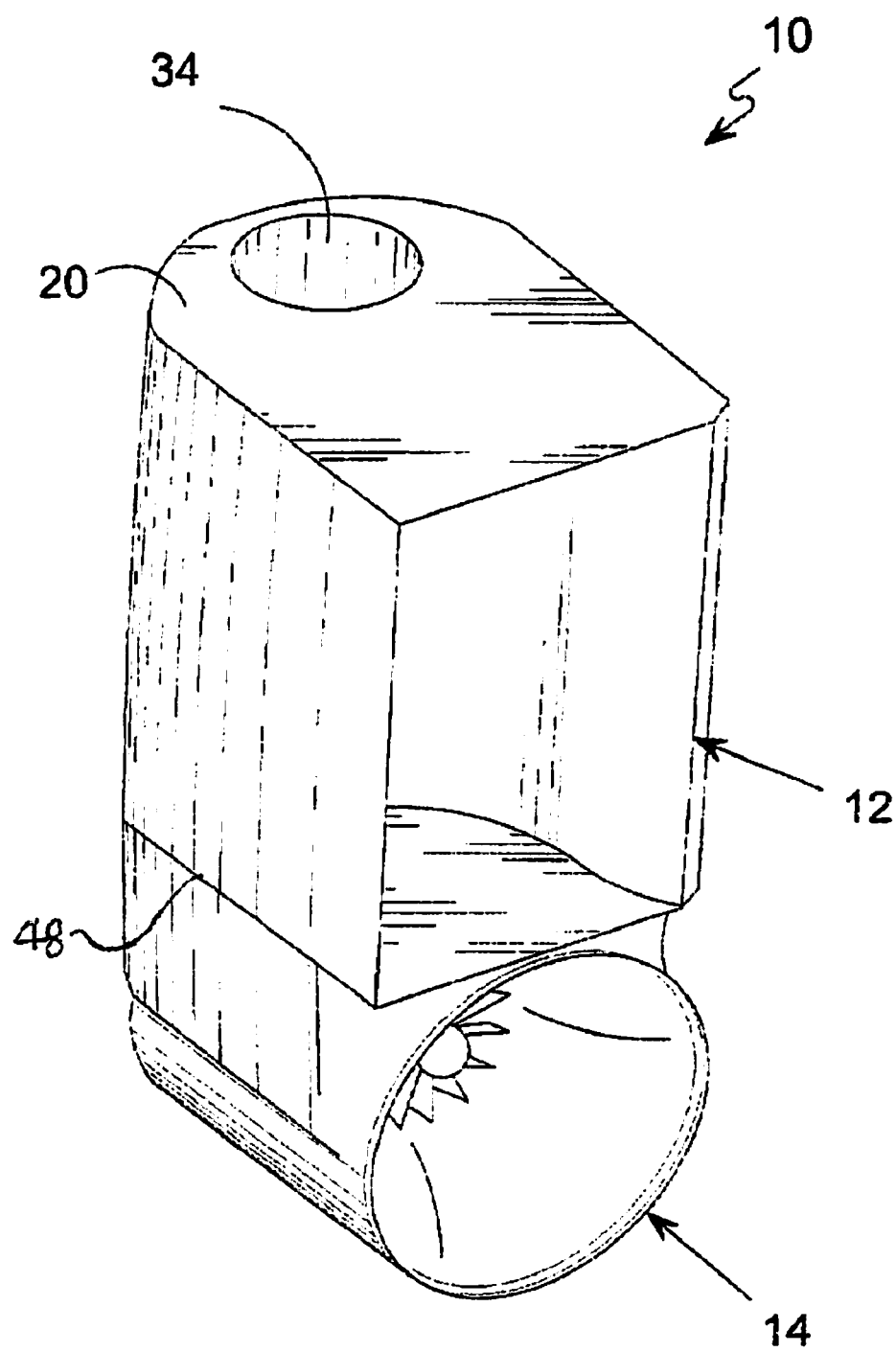
Figure 8:
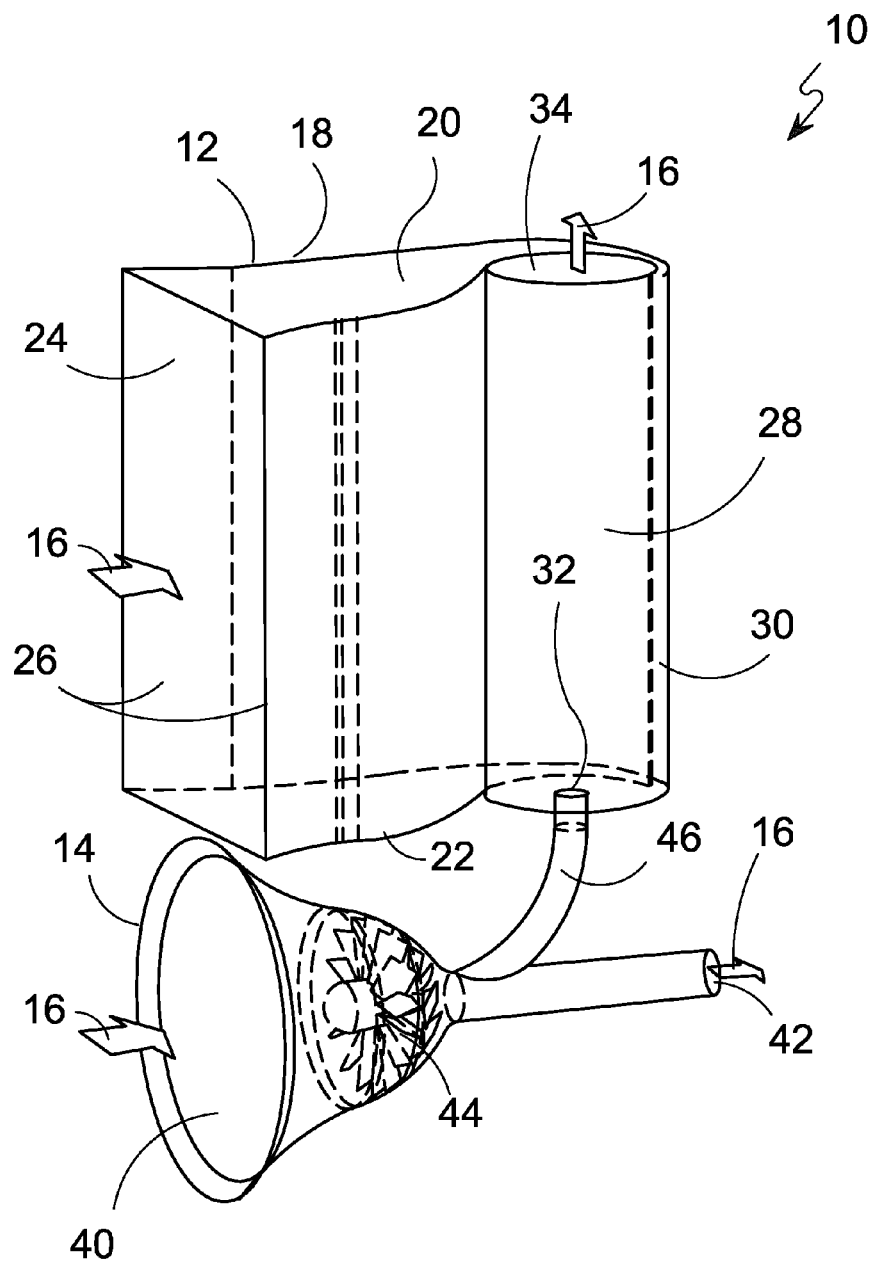
Figure 9:
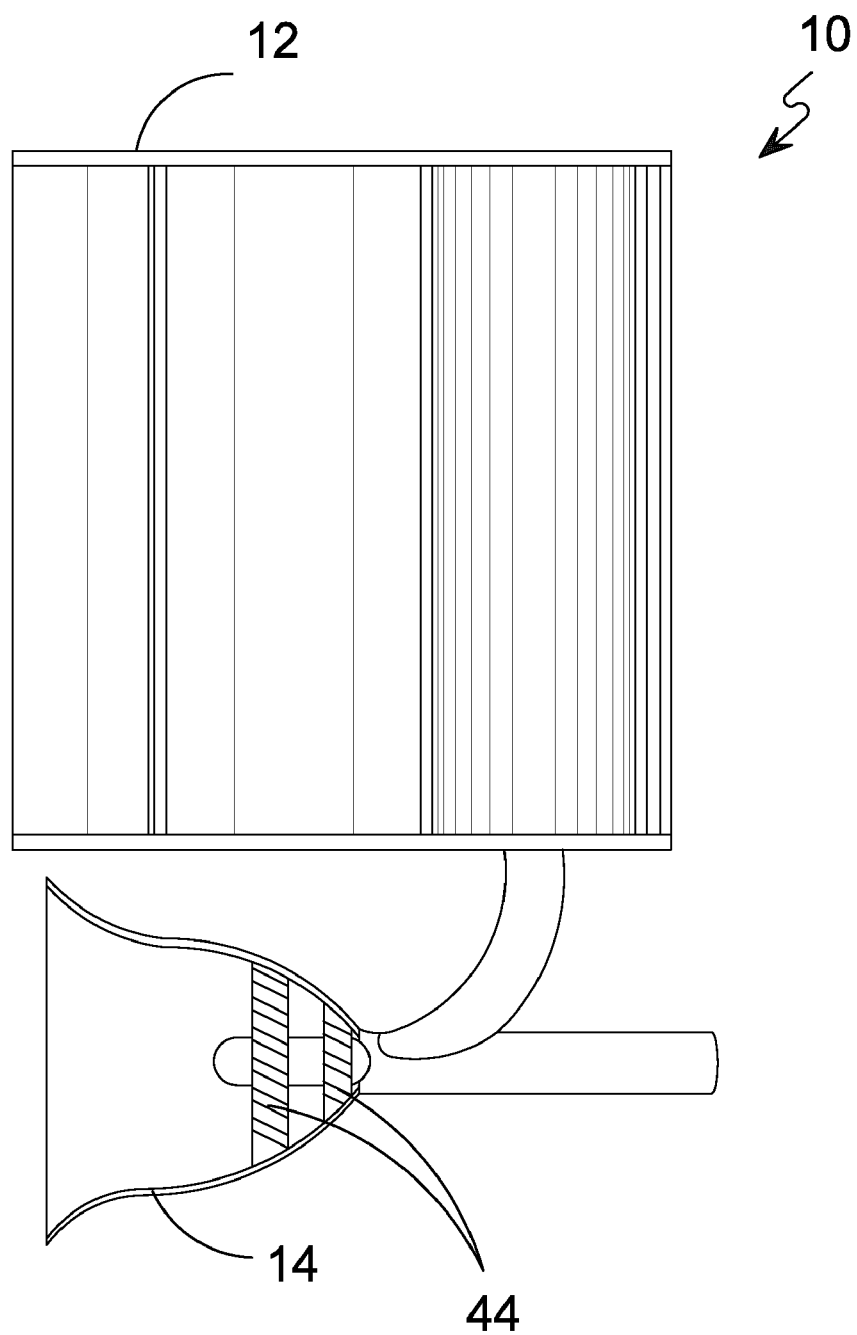
Figure 10:
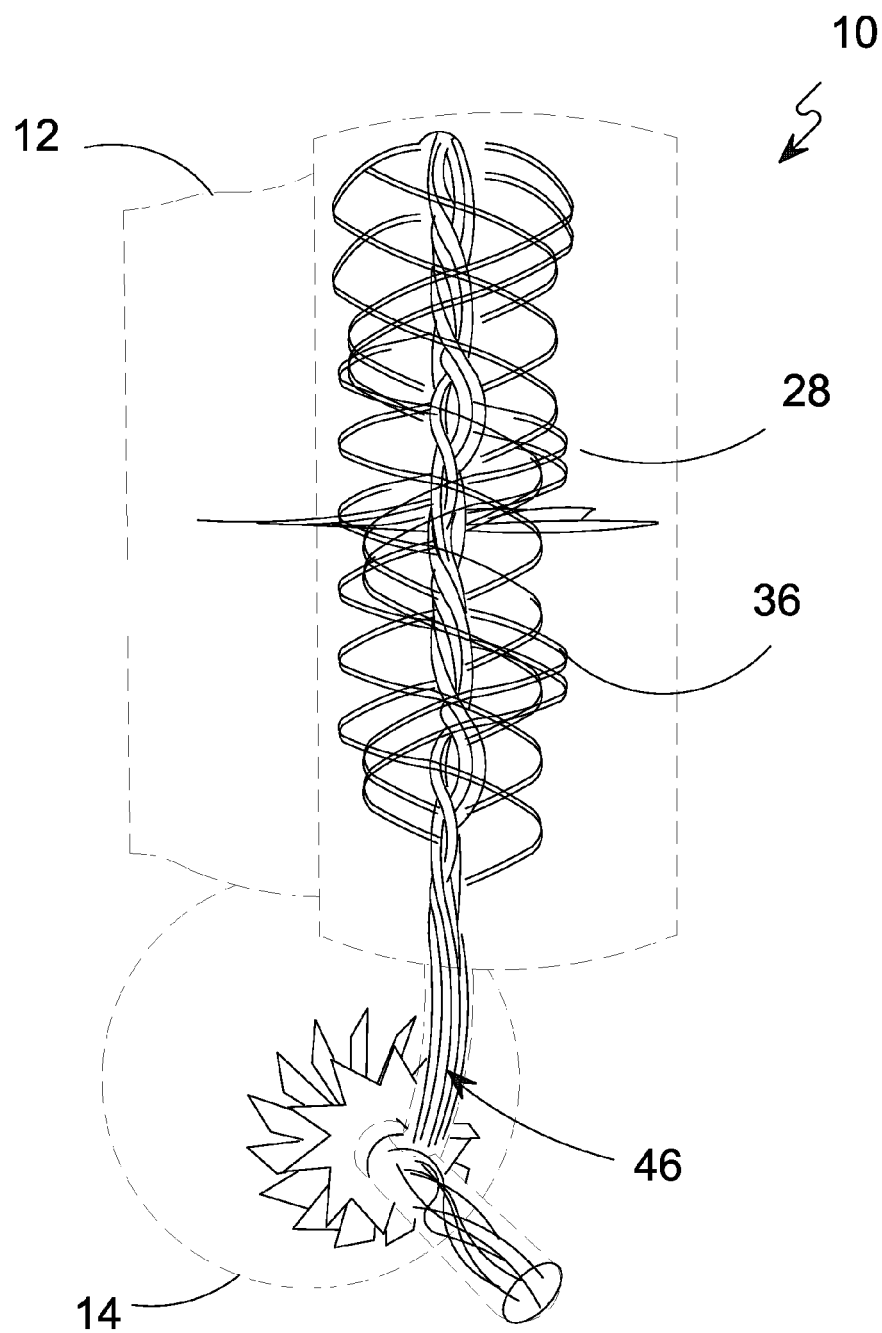

In order that the invention may be more fully understood, it will now be described, by way of example, with reference to the accompanying drawing in which:

FIG. 1 is an illustrative view of the present invention in use;
FIG. 2 is an oblique top view of the vortex unit;
FIG. 3 is an oblique side bottom view of the vortex unit;
FIG. 4 is an oblique internal view of the vortex unit;
FIG. 5 is a front view of the velocity stack;
FIG. 6 is an oblique side view of the velocity stack;
FIG. 7 is a complete view with shroud;
FIG. 8 is a diagrammatic view of the present invention in use;
FIG. 9 is a side view of the present invention; and
FIG. 10 is an illustrative view of the application of low pressure to the back side of the turbine blade system.

DESCRIPTION OF THE REFERENCED NUMERALS

Turning now descriptively to the drawings, in which similar reference characters denote similar elements throughout the several views, the figures illustrate the timing apparatus of the present invention. With regard to the reference numerals used, the following numbering is used throughout the various drawing figures.

10 vortex hydro turbine
12 vortex unit
14 turbine unit
16 free flowing fluid
18 vortex housing
20 top side of 18
22 bottom side of 18
24 intake of 18
26 wall of 18
28 vortex chamber of 18
30 nozzle of 28
32 vacuum nozzle
34 vortex chamber outlet
36 vortex of 12
40 velocity stake/intake of 14
42 tail pipe/output of 14
44 turbine blade system
46 depending conduit
48 buoyancy shroud

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1 shown is an illustrative view of the Vortex Hydro Turbine of the present invention in use. Depicted is the Vortex Hydro Turbine 10 having vortex chamber 28 housed within vortex unit 12 and turbine unit 14 housing turbine blade system 44 in fluid communication with the vortex chamber via low pressure conduit 46.

Referring to FIGS. 2 through 4 comprises the Vortex unit that can be constructed out of various materials depending on the size of the unit and the forces that will be encountered. The unit will create the vortex and the low pressure area that will drive the whole system. A Utility size version would be constructed of steel or composite material with a fiberglass coating (or similar low friction material) on the flow surfaces to decrease fouling and friction. The front 24 and sides 26 are formed with a flange to create an even flow into the unit and to provide a hydrodynamic form to the buoyancy shroud 48 shown in FIG. 7. The top 20 is flat to provide smooth flow of the existing currents across the top of the unit and over the outlet hole 34. Side wall 24 will be shaped to funnel the available water flow into 28 the body of the vortex chamber and into the nozzle 30 on FIG. 3. FIG. 2 is another angle of the same unit showing how the top 20 extends into flange 27 beyond the edge of the sides 26 which are part of the buoyancy area and will also have the framing to support the sides 26, vortex chamber wall 28. The vacuum nozzle 32 is at the center of the vortex unit 28 and will be connected with a depending conduit 46 to the blades system 44 or velocity section depending on configuration. FIG. 4 Oblique Internal View shows the path of the water as it enters the unit and is choked down for an increase in speed and decrease in pressure prior to entering the Vortex Chamber 28.

Referring to FIGS. 5 and 6, shown is a matched Velocity stack that funnels the water through intake 14 and provides a pressure dome in front of the blades through reduction in entry sides 14. The hub will also be sized to reduce losses from unproductive blade area, and provide a means to mount rotors (not shown), as well as help channel the water to stators (not shown) and through the blades 44. The Blades assembly 44 is more like a pump turbine blades than like windmill blades giving them greater area for which the pressure differential will have to work with. FIG. 5 represents the front view showing the reduction of the tube area to equal that of the area of the blades 44 and is then connected to 46 the depending conduit that connects the Velocity Stack with the Vortex Unit. The tail pipe 42 will be used to balance the system and to compensate for velocity changes in the water.

Referring to FIG. 7, shown is an example of one embodiment of the vortex hydro turbine 10 with the buoyancy shroud 48 installed. The buoyancy shroud 48 is where the anchoring cables or mounts will be attached and the generator and associated electronics will be housed within.

Referring to FIG. 8, shown is an illustrative view of the vortex hydro turbine. Shown is the vortex unit 12 having top side 20 and bottom side 22 with side wall 26 extending therebetween. Top wall 20 has aperture 34 forming egress for free flowing fluid 16. The free flowing current 16 passes into front aperture intake 24 and is channeled by walls 26 into vortex chamber 28 via nozzle 30. The turbine unit 14 having intake 40 leading to blade system 44 has egress outflow through the tail pipe 42 which is in fluid communication with vortex chamber vacuum nozzle 32 through the depending conduit 46 supplying the low pressure on the backside of blade system 44.

Referring to FIG. 9, shown is a side of the vortex hydro turbine having vortex unit 12 and turbine unit 14 having blade system 42, consisting of stators 45 and rotors 43.

Referring to FIG. 10, shown is an illustrative view of the application of low pressure 46 created by vortex 36 within vortex chamber 28.

What is claimed is new and desired to be protected by Letters Patent is set forth in the appended claims:

1. A vortex hydro turbine system leveraging a free flowing current to generate power comprising:
    (a) a vortex unit for channeling free flowing current of water directly into a vortex, said vortex unit comprising a housing with a top wall, bottom wall and side walls curvilinearly extending and converging therebetween and having an open front facing and receiving directly said free flowing current therein for defining said vortex;
    (b) a turbine unit mounted below said vortex unit for channeling a separate free flowing current of water through a blade system; and
    (c) fluid communication through a low pressure conduit between the vortex formed in said vortex unit and connected directly to a back side of the turbine blade system whereby the vortex creates low pressure at the back side of the turbine blade system causing an increase in fluid flow through the blade system; and
    (d) an aperture in the top wall forming the top opening of the cylindrical chamber and egress for the free flowing current from the vortex unit whereas egress from said turbine is through a tail pipe connected directly to said turbine.

2. The vortex hydro turbine system of claim 1, wherein said vortex unit side walls curvilinearly converge into an aperture for a substantially cylindrical chamber whereby the free flowing current is formed into a vortex.

3. The vortex hydro turbine system of claim 2, wherein said vortex bottom wall extends from the inlet to the vortex chamber having a rise from the inlet to the nozzle to groom the incoming water stream for entry into the vortex chamber.

4. The vortex hydro turbine system of claim 3, further comprising a flange outwardly extending from the top wall and bottom wall having an exterior wall extending therebetween creating an enclosed buoyance chamber of predetermined volume for suspending the vortex unit at a desired location.

5. The vortex hydro turbine system of claim 4, wherein said turbine unit is comprised of a funnel having a front side aperture and a rear side aperture with a blade system therebetween in communication with a generator.

6. The vortex hydro turbine system of claim 5, wherein the funnel front side opening forms a velocity stack of free flowing current for the turbine blade system.

7. The vortex hydro turbine system of claim 6, wherein the funnel rear side opening forms egress for the free flowing current exiting the turbine blade system.

8. The vortex hydro turbine system of claim 7, further comprising a predetermined length of exhaust conduit forming remote egress for any turbine blade system wake.

* * * * *